United States Patent Office 3,470,013
Patented Sept. 30, 1969

3,470,013
COATED PLASTIC
Richard L. Wagner, Sherwood Park, Del., assignor to Hercules Incorporated, Wilmington, Del., a corporation of Delaware
No Drawing. Continuation-in-part of application Ser. No. 528,380, Feb. 18, 1966. This application Dec. 14, 1966, Ser. No. 601,576
Int. Cl. B44d 1/14; C23c 13/04
U.S. Cl. 117—70                                17 Claims

ABSTRACT OF THE DISCLOSURE

Coated articles, comprising polyolefins, polystyrene, styrene copolymers, blends of polystyrene with styrene-butadiene copolymers, poly(vinyl chloride), poly(vinylidene chloride), vinyl chloride-vinylidene chloride copolymers, poly[bis(chloromethyl) oxetane], chlorinated ethylene polymers, cellulose esters and ethers and polymethacrylates pretreated by coating with a thin layer of silicon monoxide and top-coated with an aqueous dispersion of an alkali metal silicate, boric acid and a finely-divided metallic agent selected from the group consisting of aluminum oxide, aluminum hydroxide, aluminum and zinc and their process of preparation. The said coated articles are particularly useful as lithographic plates, drafting film and coated abrasive sheets.

---

This is a continuation-in-part of my copending application Ser. No. 528,380, filed Feb. 18, 1966.

This invention relates to certain plastics pretreated with silicon monoxide and having a flexible silicate topcoating and to the process of their preparation.

It has now been discovered that flexible, inexpensive, scratch and abrasion resistant articles, useful as lightweight grained lithographic plates, drafting films, coated abrasive sheets, etc., can be prepared by coating a pretreated plastic with a flexible silicate top-coating. More specifically, the requirements of this invention are (1) that the surface of the plastic be pretreated by coating with a thin layer of silicon monoxide and (2) that the thus pretreated plastic be top-coated with an aqueous dispersion of an alkali metal silicate, boric acid and a finely-divided metallic agent selected from the group consisting of aluminum oxide, aluminum hydroxide, aluminum and zinc to give a flexible abrasion resistant coating. The plastic can be pretreated and top-coated on one or more surfaces. For example, if the palstic is in the form of a sheet or film, it can be pretreated and top-coated on only one side or if desired on both sides.

The plastics which can be coated in accordance with this invention are the polyolefins such as linear polyethylene, stereo-regular polypropylene, crystalline isoprene-propylene copolymers, crystalline ethylene-1-butene copolymers, crystalline ethylene-propylene copolymers, crystalline 1-butene-propylene copolymers; polystyrene; styrene copolymers including terpolymers such as acrylonitrile-butadiene-styrene terpolymers; blends of polystyrene with styrene-butadiene copolymers; poly(vinyl chloride); poly(vinylidene chloride); vinyl chloride-vinylidene chloride copolymers; poly[bis(chloromethyl) oxetane]; chlorinated ethylene polymers; cellulose esters and ethers such as cellulose acetate, cellulose acetate-butyrate, ethyl cellulose, etc.; poly methacrylates such as poly(methyl methacrylates), etc.; and blends of these plastics with each other. In certain cases, it may be desirable to blend one of the above plastics with a small amount of an elastomer such as polyisobutylene, amorphous ethylene-propylene copolymers, cispolyisoprene, ethylene-propylene-cyclopentadiene terpolymers, styrene-butadiene copolymers, styrene-acrylonitrile copolymers, styrene-methyl methacrylate copolymers, etc. The plastics can, of course, contain additives such as extenders, fillers, dyes, stabilizers, reinforcing materials such as glass fibers, asbestos fibers, etc., but the presence or absence of such additive is immaterial to the invention. While plastics of various shapes and sizes can be coated in accordance with this invention, most preferably the plastics will be in the form of sheets or films. In some cases, it may be desirable to laminate the sheet or film to a backing such as paper or cloth. It may also be desirable to orient the sheet or film by methods known in the art.

The pretreatment of the plastic with silicon monoxide can be carried out using any of the well-known vacuum deposition procedures. The thickness of the silicon monoxide coating is not critical and it can be as thin as a mono-molecular layer or as thick as $30 \times 10^{-6}$ inch. The upper limit of thickness is governed only by the requirement that the coating be flexible. From a practical point of view, however, coating thickness need not be more than about $10 \times 10^{-6}$ inch. The thickness of the silicon monoxide coating can be controlled by the temperature, deposition period and distance of the plastic from the silicon monoxide source. In general, pressures within the vacuum chamber during deposition will be maintained at $5 \times 10^{-4}$ millimeters of mercury or less and the deposition period will vary depending on the distance of the plastic from the source and the temperature. If the silicon monoxide pretreated plastic is to be stored for any length of time before top coating, it is desirable to apply a protective coating to prevent oxidation and contamination. Various methods of protective coating can be used. One method is simply to dip the pretreated plastic in an aqueous solution of carboxymethylcellulose and then allow it to dry. The carboxymethylcellulose can easily be washed away before top-coating.

As stated above the pretreated plastic is top-coated with an aqueous dispersion of an alkali metal silicate, boric acid and a finely-divided metallic agent. The finely-divided metallic agent is selected from the group consisting of aluminum oxide, aluminum hydroxide, aluminum and zinc. Exemplary alkali metal silicates are sodium silicate, potassium silicate, lithium silicate, etc. The ratio of the ingredients in the aqueous dispersion can vary over a wide range, but in general the alkali metal silicate will constitute from about 15% to about 75%, most preferably from about 20% to about 70%; the finely-divided metallic agent will constitute from about 22% to about 76%, most preferably from about 35% to about 64%; and the boric acid will constitute from about 0% to about 4%, most preferably from about 0.1 to about 3%, all based on the total weight of the dry ingredients. It will be understood by those skilled in the art that the specific ingredients employed in the preparation of the top coating dispersion will depend to same extent upon the end use of the article to be top-coated. For example, if the article is to be used as an abrasive sheet one would select a finely-divided metallic agent which is very hard and has sharp edges such as aluminum oxide. If the article is to be used as a drafting film for tracing one would avoid the use of finely-divided metallic agents which would render the film opaque (i.e., finely-divided aluminum or zinc).

general, however, the alkali metal silicate will be dis-
The dispersion can be prepared in various ways; in solved in water, the boric acid then added as a saturated aqueous solution with agitation and then the metallic agent added in the form of finely-divided particles. If desired, the dispersion can then be ball-milled to improve the dispersement of ingredients; however, such milling is not necessary and excellent top coatings are prepared merely by blending the ingredients with agitation as described above. It is believed that silica gel particles are formed as a result of reaction between the alkali metal silicate and boric acid and that these particles are held together by aluminum or zinc silicate complexes formed by reaction between the metallic agent and the silicate. In addition to the principal ingredients, it may be desirable in certain cases to add still other ingredients. For example, zinc oxide can be added as a substitute for at least a part of the metallic agent; titanium dioxide can be added as a pigment in amounts up to about 10%, based on the total weight of the dry ingredients; antimonous sulfide can be added in small amounts (less than about 4%) to reduce porosity; phosphoric acid or aluminum orthophosphate can be added as a substitute for at least a part of the boric acid; elastomers such as carboxylated styrene-butadiene copolymers can be added in amounts up to about 50% to increase flexibility, etc. The aluminum, zinc, aluminum oxide, aluminum hydroxide, zinc oxide, titanium dioxide and antimonous sulfide will preferably be used in the form of finely-divided particles of a size smaller than about $200\mu$. By varying the size of the particles, it is possible to obtain various finishes. For example, a microscopic roughness approximating lithographic graining can be obtained by using particles smaller than about $10\mu$. Using larger size particles (above $10\mu$) an abrasive finish can be obtained. Where the finished article is to be used as an abrasive sheet grit particles such as silicon carbide, diamonds, garnet, emery, flint, etc., can be added to the top-coating dispersion or applied directly to the top-coated article while the top coating is still wet. The aqueous dispersion can be applied by any convenient method such as spraying, dipping, brushing, curtain coating, trailing blade coating, etc. In some cases, depending on the formulation used, it may be desirable to cure the coating. The curing period will depend upon the temperature, which in turn will be governed by the distortion or softening point of the plastic substrate. In general, this period can be as short as a matter of minutes at elevated temperatures or as long as several days at room temperature. The thickness of the top coating is not critical but in general will be from about 0.1 mil to about 5 mils. Top coatings above about 5 mils in thickness tend to be brittle. Some of the resulting top-coated plastics may be slightly porous (i.e., the top-coating may be slightly porous). While such articles are quite acceptable, it may be desirable to seal their surface when using them as lithographic plates. One simple method is merely dipping the coated plastic into an aqueous solution of an alkali metal silicate, draining off excess solution, dipping into a saturated solution of boric acid, rinsing with water and allowing to dry.

As stated above, the top-coated plastics of this invention are particularly useful as lithographic plates. The thickness of the plastic sheet used in preparing such plates is not critical but will, in general, be at least about 3.5 mils and should preferably be uniform to within ±10% variation. In certain cases it may be desirable to pigment the sheet. For example, such pigmentation can be used to furnish a contrasting color for the diazo image layer and to reduce halation.

Such lithographic plates can readily be converted into lithographic printing plates by virtue of the hydrophilic character of the silicate coating. For example, a negative working plate can be obtained by coating with a photo resist and exposing through a negative transparency so as the render the photo resist insoluble and oleophilic in the exposed areas. When the nonexposed image is dissolved away, the hydrophilic silicate surface is laid bare and a negative working plate results. The lithographic plates can be imaged by conventional techniques. For example, photo-sensitive resists such as used in the deep etch process or diazo coatings such as used to image wipe-on or presensitized lithographic plates are applicable.

The top-coated plastic of this invention is also particularly useful as a unique type of drafting film. By controlling the surface roughness of the top-coating a fine matte texture can be obtained. While film transparent in the true sense can not be prepared, it can be prepared so as to have contact clarity and be useful for tracings. By contact clarity is meant the characteristic of being clear or transparent when in contact with a drawing, printed page, etc. One of the most important advantages of the drafting film of this invention is that it can be used directly as a lithographic printing plate if it is marked with an oleophilic ink or crayon. For example, a drawing can be made on a sheet of the drafting film using an oleophilic ink. Then the film can be placed on a lithographic printing press and thousands of copies of the drawing can be made.

The top-coated plastics of this invention are also particularly useful as coated abrasive sheets (commonly called sandpaper). Roughness varying from fine to coarse can be obtained by varying the particle size of the metallic agents in the top-coating. The abrasive sheets can be used either dry or wet without any loss in strength or efficiency. One important advantage of these abrasive sheets is their ease of manufacture in comparison with prior art abrasive sheets. For example, wet strength sandpaper in the past has been made by (1) impregnating a paper or cloth stock with a wet strength resin, (2) curing the thus impregnated stock, (3) coating the stock with a water barrier tie coating, (4) top-coating with an adhesive or binder, (5) embedding grit particles in the adhesive or binder coating, (6) curing the top-coating, (7) sizing with an adhesive, and (8) curing the sizing. In comparison it has now been found that plastic sheets with firmly bonded abrasive coating can be prepared by merely pretreating the plastic sheet with a thin layer of silicon monoxide and then top-coating with one of the aqueous silicate dispersions described above.

The top-coated plastics of this invention can also be used for numerous other purposes. If a thicker plastic substrate is used or if a thin silicate coated plastic film is laminated to another substrate, it makes an excellent replacement for ceramic tile, plastic based china-type dinnerware, plastic based bath tubs, etc. Still another use is as decorative and protective coatings when laminated on wood, fiber board, plastic, metal, etc.

The following examples are presented for purposes of illustration, parts and percentages being by weight unless otherwise specified.

Example 1

An extruded sheet of 0.01 inch thick polypropylene having a molecular weight of approximately 600,000 was cut into a 10 x 16 inch plate and placed in a vacum chamber equipped with an electrically heated tungsten filament. The filament heated an 0.2 gram sample of silicon monoxide to its vaporization temperature. Deposition time was approximately 2 minutes at a distance of 10 inches and the chamber was subjected to a vacuum of $4.5 \times 10^{-4}$ plate had a $3 \times 10^{-6}$ inch coating of silicon monoxide.

A top-coating dispersion was formulated as follows. To 48 parts of water was added 22 parts of potassium silicate with heating and agitation. After the silicate went into solution, a saturated aqueous solution of boric acid equivalent to one part of boric acid (based on dry weight) was slowly added with agitation. As the boric acid was stirred in, small gel particles could be seen to form. Finally 23 parts of aluminum oxide and 6 parts of zinc oxide were added and the whole agitated overnight. Both the aluminum oxide and the zinc oxide had an average particle size of one micron. The resulting top-coating was a white dispersion having the consistency of heavy cream. The above-described pretreated plate was spray-coated with the top-coating and baked for one hour at 120° C. The resulting coating was approximately 1 mil in thickness. It was treated for abrasive and scratch resistance by the "coin scratch test" (the edge of a nickel was placed firmly against the plate and scraped across the surface in an effort to remove the top-coating). It was not possible to remove the coating. An untreated control sheet of polypropylene was coated with the top-coating dispersion and baked exactly as described above. The top-coating flaked and fell off when the control was turned upside down, flexed slightly and shaken..

The surface of the pretreated top-coating plate was sealed as follows. The plate was dipped into a 2% aqueous solution of potassium silicate and drained. Then the plate was dipped into a saturated solution of boric acid, rinsed with water, and air dried. The resulting lithographic plate had a microscopic surface roughness similar to the surface of a lithographically grained metal plate.

The plate was then converted to a printing plate by coating with a commercial ink-receptive diazo coating. After exposing through an image-bearing transparency and development of the plate, copies were run on a lithographic printing press. Even after running 100,000 copies, the background was still clear. The plate was examined and found to be undamaged. The top-coating still adhered tightly to the pretreated polypropylene substrate.

Example 2

A plate was prepared using a sheet of polypropylene exactly as described in Example 1 except the aluminum oxide and zinc oxide were omitted from the formulation of the top coating. On curing a hard, brittle surface formed which cracked on flexing and could not be used as a printing plate.

Example 3

A plate was prepared using a sheet polypropylene exactly as described in Example 1 except the top-coating was approximately 8 mils in thickness. After curing for one hour at 120° C., the resulting sheet was severely flexed causing cracking of the coating. Samples of the coating were removed and tested. It was found that the silicon monoxide layer and a thin layer of polypropylene remained attached to the underside of the top-coating. Thus, cohesive failure occurred within the polymer substrate.

Example 4

A sheet of polypropylene as described in Example 1 was cut into a 10 x 16 inch plate and pretreated with silicon monoxide also as described in Example 1.

A top-coating dispersion was formulated as follows. To 50 parts of water was added 21 parts of potassium silicate with agitation. After the silicate went into solution, a saturated aqueous solution of boric acid equivalent to one part of boric acid (based on dry weight) was slowly added with agitation. As the boric acid was stirred in, small gel particles could be seen to form. Then 23 parts of aluminum oxide and 5 parts of zinc oxide were added with agitation. Finally, 2 parts of antimonous sulfide was added and the whole agitated overnight. The aluminum oxide and the zinc oxide has an average particle size of 1 micron the antimonous sulfide had an average particle size of 0.5 micron. The pretreated plate was spray-coated with the top-coating and baked for one hour at 120° C. The resulting coating was approximately 1 mil in thickness and extremely abrasion and scratch resistant. The plate was then converted into a printing plate as described in Example 1. After a 35,000 copy run on a lithographic printing press, the plate was examined and found to be undamaged. The prints were of excellent quality.

Example 5

A lithographic plate was prepared exactly as described in Example 1 except a smooth 0.01 inch thick sheet of poly(vinyl chloride) having a specific viscosity of 0.4 as measured by ASTM D–1243–52T was substituted for the sheet of polypropylene. The plate was converted to a printing plate as described in Example 1 and run on a lithographic printing press. After printing 40,000 copies, the plate was removed and found to be undamaged. The prints were of excellent quality.

Example 6

A sheet of 0.01 inch thick linear high-density polyethylene having a molecular weight of approximately 150,000 was cut into a 10 x 16 inch plate. The plate was coated with a $3 \times 10^{-6}$ inch coating of silicon monoxide as described in Example 1.

A top-coating dispersion was formulated as follows. To 48 parts of water was added 30 parts of sodium silicate with agitation. After the silicate went into solution, a saturated aqueous solution of boric acid equivalent to 0.5 part of boric acid (based on dry weight) was slowly added with agitation. As the boric acid was stirred in, small gel particles formed. Finally, 21.5 parts of aluminum oxide were added and the whole agitated overnight. The aluminum oxide had an average particle size of 0.5 micron. Following the overnight agitation, the dispersion was ball-milled for 18 hours. The above-described pretreated plate was coated with the top-coating using a curtain coater. It was then baked for one hour at 100° C. The resulting coating was approximately 1.5 mils in thickness and extremely abrasion and scratch resistant. The plate was then converted to a printing plate as described in Example 1. After a 30,000 copy run on a lithographic printing press, the plate was examined and found to be undamaged. The prints were of excellent quality.

Example 7

A lithographic plate was prepared exactly as prepared in Example 1 except an 0.02 inch thick sheet of poly(3,3 bis-(chloromethyl) oxetane) having a molecular weight of approximately 270,000 was substituted for the sheet of polypropylene. The plate was then converted to a printing plate by coating with an ink-receptive diazo coating and imaging with fine line, solid and half tone images. The plate was used on a lithographic printing press, and run of 35,000 copies made. The prints were of excellent quality and the plate was undamaged.

Example 8

A sheet of 0.016 inch thick impact resistant polystyrene having a specific gravity of 1.06 was cut into a 10 x 16 inch plate. The plate was coated with a $1.5 \times 10^{-6}$ inch coating of silicon monoxide as described in Example 1.

A top-coating dispersion was formulated as follows. To 50 parts of water was added 16 parts of potassium silicate with agitation. After the silicate went into solution, a saturated aqueous solution of boric acid equivalent to 0.5 part of boric acid (based on dry weight) was slowly added with agitation. Then 0.5 part of phosphoric acid was slowly added with agitation. Finally, 30 parts of aluminum hydroxide and 3 parts of zinc oxide were added and the whole agitated overnight. Both the aluminum hydroxide and the zinc oxide had an average particle size of 1 micron. The above-described pretreated plate was brush-coated with the top-coating. It was then baked for 1½ hours at 70° C. The resulting coating was approximately 2 mils in thickness and extremely abrasion and scratch resistant.

The surface of the pretreated top-coated plate was sealed as described in Example 1. The plate was then converted to a printing plate by coating with a commercial ink-receptive photo-resist. After exposure through a negative transparency, the water soluble areas were removed exposing the hydrophilic silicate top coating. The resulting printing plate was used to print 25,000 copies on a lithographic printing press. The prints were of excellent quality and the plate was undamaged.

Example 9

This example illustrates the use of a paper backed plastic.

A section of 80 lb. bleached kraft board coated by extrusion coating with a 1 mil layer of vinyl chloride-vinylidene chloride copolymer containing 10% vinyl chloride and having a specific gravity of 1.68 was cut into a 10 x 16 inch plate. The plate was coated with a $2 \times 10^{-6}$ inch coating of silicon monoxide as described in Example 1.

A top coating dispersion was formulated as follows. To 50 parts of water was added 16 parts of potassium silicate with agitation. After the silicate went into solution, a saturated aqueous solution of boric acid equivalent to 1.0 part of boric acid (based on dry weight) was slowly added with agitation. Finally, 32 parts of finely-divided metallic zinc having an average particle size of 2 microns was added and the whole agitated overnight. The above-described paper-backed, pretreated plate was spray coated with the top coating. It was then baked for 1 hour at 70° C. The resulting coating was approximately 1.5 mils in thickness and had a metallic appearance of a grained metal plate. Abrasion and scratch resistance were good.

The surface of the top-coated plate was sealed as described in Example 1. The plate was then converted to a printing plate by coating with a commercial ink-receptive photo-resist. After exposure through a negative transparency, the water soluble areas were removed exposing the hydrophilic silicate top-coating. The resulting printing plate was used to print 25,000 copies on a lithographic printing press. The prints were of excellent quality and the plate was undamaged.

Example 10

A sheet of 0.02 inch thick cellulose mixed ester containing 50% combined cellulose, 37% combined butyl groups and 13% combined acetyl groups was cut into a 10 x 16 inch plate. The plate was coated with a $2 \times 10^{-6}$ inch coating of silicon monoxide as described in Example 1. A top-coating dispersion was formulated as follows. To 50 parts of water was added 25 parts of lithium silicate with agitation. After the silicate went into solution, a saturated aqueous solution of boric acid equivalent to 1.0 part of boric acid (based on dry weight) was slowly added with agitation. As the boric acid was stirred in, small gel particles formed. Finally, 22 parts of aluminum oxide and 2 parts of titanium dioxide were added and the whole agitated overnight. Both the aluminum oxide and titanium dioxide had an average particle size of 0.5 micron. The above-described pretreated plate was coated with the top-coating using a trailing blade coater. It was then dried at room temperature for 4 days. The resulting coating was approximately 0.3 mil in thickness and extremely abrasion and scratch resistant. The surface of the pretreated top-coated plate was sealed as described in Example 1. The plate was then converted to a printing plate by coating with a commercial ink-receptive photo-resist. After exposing through an image-bearing transparency and development, 30,000 copies were run on a lithographic printing press. The prints were of excellent quality and the plate was undamaged.

Example 11

An extruded sheet of 10 mil thick polypropylene having a molecular weight of approximately 800,000 was roughened on one side with a brush to render it less slippery. Then the smooth side was coated with a $4 \times 10^{-6}$ inch coating of silicon monoxide as described in Example 1.

A top-coating dispersion was formulated as follows. To 48 parts of water was added 23 parts of sodium silicate with agitation. After the silicate went into solution, a saturated aqueous solution of boric acid equivalent to 1.0 part of boric acid (based on dry weight) was slowly added with agitation. Finally, 24 parts of aluminum oxide and 5 parts of zinc oxide were added and the whole ball milled for one-half hour to disperse the ingredients. The zinc oxide had an average particle size of 1 micron. The aluminum oxide had particles of between 50 and 150 microns in diameter. The pretreated sheet was spray coated with the top-coating and then baked for one hour at a temperature of 130° C. The resulting coating was approximately 1 mil in thickness and had the appearance of rough sandpaper.

The coated abrasive sheet was found to be entirely satisfactory in both dry and wet sanding on both wood and metals. There was no tendency to soften or otherwise change its handling characteristics even after continued use.

Example 12

A coated abrasive sheet was prepared exactly as described in Example 11 except an 8 mil extruded sheet of a blend of polystyrene with a styrene-butadiene copolymer was substituted for the sheet of polypropylene. The blend contained 90% of a polystyrene having a molecular weight of approximately 300,000 and 10% of a styrene-butadiene copolymer having a molecular weight of approximately 300,000. The copolymer contained 28% styrene and 72% butadiene.

The coated abrasive sheet was found to be completely satisfactory in both dry and wet sanding of automotive sealer.

Example 13

A sheet of 0.02 inch thick ethylene-propylene copolymer having a molecular weight of approximately 600,000 and containing 5 mole percent ethylene was uniaxially oriented by drawing four times its length and then cut into a 10 x 16 inch plate. The resulting plate was pretreated with silicon monoxide as described in Example 1.

A top-coating dispersion was formulated as follows. To 50 parts of water was added 22 parts of potassium silicate with agitation. After the silicate went into soluion, a saturated aqueous solution of boric acid equivalent to 1.0 part of boric acid (based on dry weight) was slowly added with agitation. Finally, 30 parts of finely-divided metallic aluminum having an average particle size of 1.5 microns was added and the whole agitated overnight. The pretreated sheet was spray coated with the top-coating and then baked for one hour at 90° C. The resulting coating was approximately 1.5 mils in thickness and had a metallic appearance of a grained metal plate. Abrasion and scratch resistance were good.

The surface of the top-coated plate was sealed as described in Example 1. The plate was then converted to a printing plate by coating with a commercial ink-receptive photo-resist. After exposure through a negative transparency, the water soluble areas were removed exposing the hydrophilic silicate top coating. The resulting printing plate was used to print 25,000 copies on a lithographic printing press. The prints were of excellent quality and the plate was undamaged.

Example 14

A sheet of 0.015 inch thick poly(methyl methacrylate) having a molecular weight of approximately 150,000 was cut into a 10 x 16 inch plate. The plate was coated with a $3 \times 10^{-6}$ coating of silicon monoxide as described in Example 1.

A top coating dispersion was formulated as follows. To 48 parts of water was added 20 parts of sodium silicate with agitation. After the silicate went into solution, a saturated aqueous solution of boric acid equivalent to 2 parts of boric acid (based on dry weight) was slowly added with agitation. As the boric acid was stirred in, small gel particles could be seen to form. Finally, 15 parts of aluminum oxide and 15 parts of zinc oxide were added and the whole agitated overnight. Both the aluminum oxide and zinc oxide had an average particle size of 1 micron. The above-described pretreated plate was spray-coated with the top coating and baked for one-half hour at 65° C. The resulting coating was approximately 0.75 mil in thickness and extremely abrasion and scratch resistant. The surface of the pretreated top-coated plate was sealed as described in Example 1. The plate was then converted into a printing plate as described in Example 1 and run on a lithographic printing press. After printing 10,000 copies, the plate was removed and found to be undamaged. The prints were of excellent quality.

Example 15

This example illustrates the preparation and use of a drafting film.

An extruded sheet of 5 mil thick polypropylene having a molecular weight of approximately 600,000 was coated with a $3 \times 10^{-6}$ inch coating of silicon monoxide as described in Example 1.

A top-coating dispersion was formulated as follows. To 48 parts of water was added 22.35 parts of potassium silicate with agitation. After the silicate went into the solution a saturated aqueous solution of boric acid equivalent to 0.65 part of boric acid (based on dry weight) was slowly added with agitation. Finally, 29 parts of aluminum oxide was added and the whole ball milled for 2 hours to insure good dispersion. The aluminum oxide had an average particle size of 1 micron. The pretreated sheet was spray coated with the top coating and then baked for 30 minutes at 105° C. The resulting coating was approximately 1 mil in thickness. It appeared to be opaque and white but when superimposed upon an engineering drawing, the drawing could clearly be seen through the film. The drawing was traced in the drafting film using an oleophilic type ink. The film was then placed on a lithographic printing press and 1,000 copies of the tracing were made. The prints were of excellent quality and the film was undamaged.

Samples of the top-coated drafting film were tested for acceptability of various pencil, ink and crayon marks. It was found that all commonly used marking materials could readily be used. Erasability of pencil marks was excellent with no tendency to form ghost images.

Example 16

A drafting film was prepared exactly as described in Example 15 except a 6 mil sheet of chlorinated polyethylene was substituted for the sheet of polyproylene. The chlorinated polyethylene was prepared by chlorinating a polyethylene having a molecular weight of approximately 150,000 until it contained 48% chlorine. An original engineering drawing was made on the film using an oleophilic ink. The film was then used as a lithographic printing plate and 3,000 copies of the drawing were made. The prints were made. The prints were of excellent quality and the film was undamaged.

Example 17

A drafting film was prepared exactly as described in Example 15 except that it was pretreated with silicon monoxide and then top-coated on both sides. One side of the film was coated with a commercial photosensitive resin. On the reverse side, an engineering drawing was made using black ink. From the drafting film a negative lithographic printing plate was prepared. The photosensitive coating was exposed by shining a light through the film and then the print was developed by conventional means. The resulting lithographic printing plate was used to make 2,000 copies of the drawing. The copies were of excellent quality and the film was undamaged.

What I claim and desire to protect by Letters Patent is:

1. As an article of manufacture, a plastic selected from the group consisting of polyolefins, polystyrene, styrene copolymers, blends of polystyrene with styrene-butadiene copolymers, poly(vinyl chloride), poly(vinylidene chloride), vinyl chloride-vinylidene chloride copolymers, poly[bis(chloromethyl) oxetane], chlorinated ethylene polymers, modified cellulose, and polymethacrylates pretreated with a thin coating of silicon monoxide and top coated with a thin flexible silicate layer comprising the reaction product of from about 15% to about 75% of an alkali metal silicate with from about 0% to about 4% of boric acid and from about 22% to about 76% of a finely-divided metallic agent selected from the group consisting of aluminum, zinc, aluminum oxide, and aluminum hydroxide, said percentages being based on the total weight of the dry ingredients in said top coating.

2. The article of claim 1 wherein the plastic is a polyolefin.

3. The article of claim 2 wherein the polyolefin is polypropylene.

4. The article of claim 2 wherein the polyolefin is polyethylene.

5. The article of claim 1 wherein the plastic is polystyrene.

6. The article of claim 1 wherein the plastic is poly[bis(chloromethyl) oxetane].

7. The article of claim 1 wherein the plastic is poly (vinyl chloride).

8. The article of claim 1 wherein the plastic is blends of polystyrene with styrene-butadiene copolymers.

9. A lithographic printing plate comprising a plastic substrate selected from the group consisting of polyolefins, polystyrene, styrene copolymers, blends of polystyrene with styrene-butadiene copolymers, poly(vinyl chloride), poly(vinylidene chloride), vinyl chloride-vinylidene chloride copolymers, poly[bis(chloromethyl) oxetane], chlorinated ethylene polymers, modified cellulose, and polymethacrylates pretreated with a thin coating of silicon monoxide and top-coated with a thin flexible silicate layer comprising the reaction product of from about 15% to about 75% of an alkali metal silicate with from about 0.1% to about 3% of boric acid and from about 22% to about 76% of a finely-divided metallic agent having a particle size of less than about $10\mu$ selected from the group consisting of aluminum, zinc, aluminum oxide, and aluminum hydroxide, said percentages being based on the total weight of the dry ingredients in said top-coating.

10. A coated abrasive sheet comprising a plastic sheet selected from the group consisting of polyolefins, polystyrene, styrene copolymers, blends of polystyrene with styrenebutadiene copolymers, poly(vinyl chloride), poly (vinylidene chloride), vinyl chloride-vinylidene chloride copolymers, poly[bis(chloromethyl) oxetane], chlorinated ethylene polymers, modified cellulose, and polymethacrylates pretreated with a thin coating of silicon monoxide and top-coated with a thin flexible silicate layer comprising the reaction product of from about 15% to about 75% of an alkali metal silicate with from about 0% to about 4% of boric acid and from about 22% to about 76% of a finely-divided metallic agent having a particle size greater than about $10\mu$ selected from the group consisting of aluminum oxide and aluminum hydroxide, said percentages being based on the total weight of the dry ingredients in said top-coating.

11. A drafting film comprising a plastic film selected from the group consisting of polyolefins, polystyrene, styrene copolymers, blends of polystyrene with styrene-butadiene copolymers, poly(vinyl chloride), poly(vinylidene chloride), vinyl chloride-vinylidene chloride copolymers, poly[bis(chloromethyl) oxetane], chlorinated ethylene polymers, modified cellulose, and polymethacrylates pretreated with a thin coating of silicon monoxide and top-coated with a thin flexible silicate layer comprising the reaction product of from about 15% to about 75% of an alkali metal silicate with from about 0% to about 4% of boric acid and from about 22% to about 76% of a finely-divided metallic agent having a particle size of less than about $10\mu$ selected from the group consisting of aluminum oxide, and aluminum hydroxide, said percentages being based on the total weight of the dry ingredients in said top-coating.

12. A process for preparing coated plastic which comprises the following steps:
   (a) pretreating a plastic selected from the group consisting of polyolefins, polystyrene, styrene copolymers, blends of styrene with styrene-butadiene copolymers, poly(vinyl chloride), poly(vinylident chloride), vinyl chloride-vinylidene chloride copolymers, poly[bis(chloromethyl) oxetane], chlorinated ethylene polymers, modified cellulose, and polymethacrylates by vacuum depositing a thin coating of silicon monoxide on its surface (b) top-coating the pretreated plastic with an aqueous dispersion of from about 15% to about 75% of an alkali metal silicate, from about 0% to about 4% of boric acid and from about 22% to about 76% of a finely-divided metallic agent selected from the group consisting of aluminum, zinc, aluminum oxide, and aluminum hydroxide, said percentages being based on the total weight of the dry ingredients.

13. The process of claim 12 wherein the aqueous dispersion contains a small amount of zinc oxide in addition to the principal ingredients.

14. The process of claim 12 wherein the aqueous dispersion contains a small amount of antimonous sulfide in addition to the principal ingredients.

15. The process of claim 12 wherein the aqueous dispersion contains a small amount of abrasive particles selected from the group consisting of silicon carbide, diamonds, garnet, emery and flint.

16. The process of claim 12 wherein the top-coating is sealed by dipping in an aqueous solution of an alkali metal silicate, draining and then dipping in an aqueous solution of boric acid.

17. The process of claim 12 wherein the top-coating is cured by heating at an elevated temperature.

References Cited

UNITED STATES PATENTS

| | | | |
|---|---|---|---|
| 2,786,778 | 3/1957 | Palmquist | 117—12 |
| 2,952,562 | 9/1960 | Morris et al. | 117—62 |
| 3,002,857 | 10/1961 | Stalego | 117—126 |
| 3,181,461 | 5/1965 | Fromson | 101—149.2 |
| 3,223,032 | 12/1965 | Boardman et al. | 101—149.2 |

ALFRED L. LEAVITT, Primary Examiner

J. A. BELL, Assistant Examiner

U.S. Cl. X.R.

101—453, 455, 460; 117—106, 169

PO-1050
(5/69)

UNITED STATES PATENT OFFICE
CERTIFICATE OF CORRECTION

Patent No. __3,470,013__     Dated __September 30, 1969__

Inventor(s) __Richard L. Wagner (Case X-7)__

It is certified that error appears in the above-identified patent and that said Letters Patent are hereby corrected as shown below:

Column 2, line 56 of the printed patent change " same " to -- some --.

Column 2, lines 64 and 65 of the printed patent should be reversed and read as follows: " The dispersion can be prepared in various ways; in general, however, the alkali metal silicate will be dis- ".

Col. 4, after line 57 of the printed patent, insert after " $4.5 \times 10^{-4}$ " the following: -- m.m. mercury during the process. The resulting pretreated --.

Column 5, line 57 of the printed patent change " has " to -- had --.

Column 9, line 39 of the printed patent change " polyproylene " to -- polypropylene --.

In the Claims, Claim 11, Col. 10, line 57 of the printed patent, " poly/bis(chloromethyl oxetane/ " should read -- poly/bis(chloromethyl)oxetane/ --.

Claim 12, Col. 10, line 74 of the printed patent change " vinylident " to -- vinylidene --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents